(12) United States Patent
Hiramoto

(10) Patent No.: US 7,957,488 B2
(45) Date of Patent: Jun. 7, 2011

(54) WIRELESS COMMUNICATION APPARATUS AND OPERATING FREQUENCY CONTROL METHOD OF POWER CONVERSION APPARATUS

(75) Inventor: Toshikazu Hiramoto, Yokohama (JP)

(73) Assignee: Kyocera Corporation, Kyoto (JP)

( * ) Notice: Subject to any disclaimer, the term of this patent is extended or adjusted under 35 U.S.C. 154(b) by 768 days.

(21) Appl. No.: 11/466,924

(22) Filed: Aug. 24, 2006

(65) Prior Publication Data

US 2007/0195722 A1 Aug. 23, 2007

(30) Foreign Application Priority Data

Aug. 26, 2005 (JP) ................ P2005-246609

(51) Int. Cl.
*H03K 9/00* (2006.01)
(52) U.S. Cl. ...................................... 375/316
(58) Field of Classification Search ............... 375/316, 375/307, 219, 354, 371, 373, 222; 370/318, 370/350, 503, 516; 455/73, 557, 550, 572, 455/574, 502, 571; 340/7.32, 7.33, 7.34, 340/7.35, 7.36, 7.37
See application file for complete search history.

(56) References Cited

U.S. PATENT DOCUMENTS

| 6,009,319 | A | | 12/1999 | Khullar et al. |
|---|---|---|---|---|
| 6,163,851 | A | * | 12/2000 | Yamazoe et al. ............. 713/600 |
| 6,263,192 | B1 | * | 7/2001 | Alderton .......................... 455/73 |
| 6,385,470 | B1 | * | 5/2002 | Bendixen ...................... 455/574 |
| 6,542,727 | B1 | * | 4/2003 | Kikuchi ...................... 455/343.1 |
| 7,212,786 | B2 | | 5/2007 | Kojima et al. |
| 7,596,166 | B2 | * | 9/2009 | Hongou ........................ 375/130 |
| 2006/0045215 | A1 | * | 3/2006 | Ballantyne et al. ............ 375/344 |
| 2006/0205382 | A1 | * | 9/2006 | Wang et al. .................. 455/343.1 |
| 2006/0240798 | A1 | * | 10/2006 | Jarosinski et al. ............ 455/343.1 |

FOREIGN PATENT DOCUMENTS

| JP | 04170823 A | 6/1992 |
|---|---|---|
| JP | 08331036 A | 12/1996 |
| JP | 08331037 A | 12/1996 |
| JP | 09266424 A | 10/1997 |
| JP | 11234919 A | 8/1999 |
| JP | 11341793 A | 12/1999 |
| JP | 11341794 A | 12/1999 |
| JP | 2001345732 A | 12/2001 |
| JP | 2002-051005 | 2/2002 |
| JP | 2003318771 A | 11/2003 |
| JP | 2004343632 A | 12/2004 |

OTHER PUBLICATIONS

Japanese language office action and its English language translation for corresponding Japanese application 2005246609 lists the references above.

* cited by examiner

*Primary Examiner* — Shuwang Liu
*Assistant Examiner* — Helene Tayong
(74) *Attorney, Agent, or Firm* — DLA Piper LLP (US)

(57) ABSTRACT

A wireless communication apparatus includes a DC/DC converter that is operated based on a second clock signal generated by an oscillator with high accuracy when receiving the annunciation signal. Therefore, it is possible to reduce negative influences on other electrical apparatuses due to the conduction noise. The DC/DC converter is operated based on first clock signal generated by an oscillator with low accuracy while in a non-receiving time of the annunciation signal. Therefore, it is possible to reduce negative influence on other electrical apparatuses and to reduce the consumption of electrical power.

18 Claims, 2 Drawing Sheets

WIRELESS COMMUNICATION APPARATUS AND OPERATING FREQUENCY CONTROL METHOD OF POWER CONVERSION APPARATUS

BACKGROUND OF THE INVENTION

1. Field of the Invention

The present invention relates to a wireless communication apparatus and an operating frequency control method of a power conversion apparatus.

Priority is claimed on Japanese Patent Application No. 2005-246609, filed Aug. 26, 2005, the content of which is incorporated herein by reference.

2. Description of the Related Art

In recent years, a communication module including a wireless communication function (wireless communication apparatus) is set into or built in various apparatuses and a communication system which obtains information via the communication module and operates remote monitoring or information management of the apparatuses is attracting public attention (for example, managing stored goods information or change information of a vending machine, remote monitoring of the operating state of industrial equipment and the like).

Some of the communication modules described above receive power supply from an external power source and operate. Such communication modules include a DC/DC converter (power conversion apparatus) and power supply voltage is supplied to each element of the communication module after converting the voltage by the DC/DC converter. In this operation, due to an operating frequency of the DC/DC converter, conduction noise on a power line between the external power source and the DC/DC converter occurs. Therefore, in case where the external power source supplies the power not only to the communication module but also to other electric apparatuses, or where the power line from the external power source is designed to be set close to the other electric apparatuses, if the operating frequency of the DC/DC converter coincides with a frequency band which has harmful effects on the other electric apparatuses, then there is possibility such that the conduction noise occurring on the power line has a negative influence on the other electric apparatuses. Hence, provision of an additional circuit such as a filter is required in order to prevent the conduction noise on the communication module.

For example, in Japanese Patent Application, First Publication No. 2002-51005, a structure of a relay apparatus which relays TV broadcasting (including cable TV) and is able to operate wireless communication in the case of emergency is disclosed. Such structure in which the transmitter-receiver operating wireless communication has lines closely set to apparatuses operating other broadcasting or the like is generally increasing. In such apparatuses, not only considerations with respect to the wireless communication as described above, but also considerations with respect to means which operate broadcasting or the like are needed. Naturally, other than receiving broadcasting, when an apparatus which is easily affected by a certain frequency band because of operating very accurate measuring or the like is set closely, it is necessary for the wireless communication apparatus to prevent emitting at least in the certain frequency band. Even though emission from the wireless communication apparatus itself can be prevented by the shielding case or the like, consideration of other solutions is needed with respect to radiation noise from the power line.

However, when the filter is provided at the communication module as described above, there is a problem in which the cost of the communication module increases and the size of a circuit board is increased (that is, the communication module becomes larger). In recent years, there has been a strong need for a smaller communication module and for decreasing cost, therefore, in view of such points, it is a big problem to decrease a negative influence on the other electric apparatuses because of the conduction noise along with preventing increasing cost and an increase in size of communication module.

SUMMARY OF INVENTION

The present invention is made in respect to such a problem and has an object to decrease a negative influence on tie other electric apparatuses because of the conduction noise occurring from the wireless communication apparatus along with preventing increasing cost and an increase in size of communication module.

In the present invention, as a first aspect with respect to a wireless communication apparatus, in order to achieve the object above the wireless communication apparatus includes: a power conversion apparatus which operates a switching operation based on an operation frequency regulated in accordance with an operation clock signal to convert power supplied externally to a DC power for an inside power source; a wireless communication portion; a high accuracy oscillator which is applied for communication operation of the wireless communication portion, and which generates a predetermined clock signal which becomes a predetermined frequency by dividing at a predetermined division rate; a low accuracy oscillator which has a lower accuracy than the high accuracy oscillator, and which generates a first clock signal close to the predetermined frequency; a frequency divider which divides the predetermined clock signal at a predetermined division rate, and generates a second clock signal; and a control portion which conducts a switching operation in which the operation clock signal supplied to the power conversion apparatus is switched to the second clock signal when the wireless communication portion receives an annunciation signal, and to the first clock signal when receiving of the annunciation signal is suspended.

In a second aspect of the present invention with respect to the wireless communication apparatus according to the first aspect, the control portion stops oscillation operation of the high accuracy oscillator upon suspending receiving of the annunciation signal.

In a third aspect of the present invention with respect to the wireless communication apparatus according to the first aspect, the control portion transits to a sleeping state upon suspending receiving of the signal.

In a forth aspect of the present invention with respect to the wireless communication apparatus according to the first aspect, the low accuracy oscillator is a RC oscillator.

In a fifth aspect of the present invention with respect to the wireless communication apparatus according to the first aspect, the high accuracy oscillator is a TCXO (Temperature-Compensated Crystal Oscillator). In a sixth aspect of the present invention with respect to an operation frequency control method of a power conversion apparatus in a wireless communication apparatus which includes: the power conversion apparatus which operates a switching operation based on an operation frequency regulated in accordance with an operation clock signal to convert power supplied externally to a DC power for an inside power source; and a wireless communication portion which communicates with a base station, the operation frequency control method comprising the steps of: a first step of generating with high accuracy a predetermined clock signal which is applied for communication operation of the wireless communication portion, and which has a predetermined frequency by dividing at a predetermined division rate; a second step of generating a first clock signal which has a lower accuracy than the first step and which is close to the predetermined frequency; a third step of generating a second clock signal by dividing the predetermined clock signal at a predetermined division rate; and a fourth step of conducting a switching operation in which the operation clock signal supplied to the power conversion apparatus is switched to the second clock signal when the wireless communication portion receives an annunciation signal from the base station and to the first clock signal when receiving of the annunciation signal is suspended.

In accordance with the present invention, it is possible to reduce power consumption without increasing cost and without increasing size of communication module and to decrease a negative influence on the other electric apparatuses because of noise occurred from the wireless communication apparatus.

DETAILED DESCRIPTION OF THE INVENTION

Figure 1:
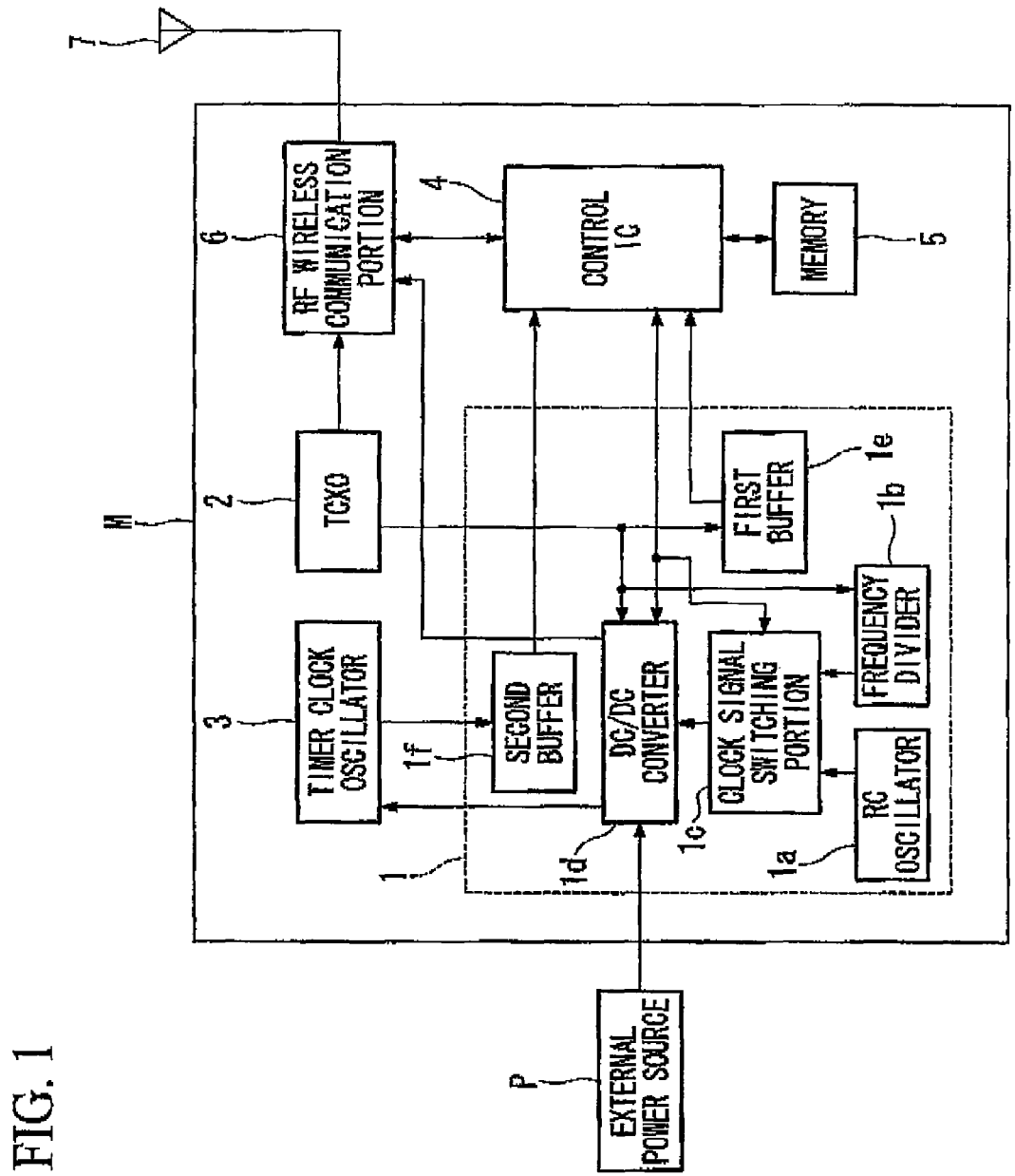
FIG. 1 is a structural block diagram of a wireless communication apparatus of one embodiment of the present invention.

Hereafter, referring to figures, one embodiment of the present invention is explained. FIG. 1 is a structural block diagram of a wireless communication apparatus of an embodiment of the present invention. As shown in this figure, a wireless communication apparatus M has a power source IC 1, a TCXO (temperature-compensated crystal oscillator, high accuracy oscillator) 2, a timer clock oscillator 3, a control IC (controlling portion) 4, a memory 5, a RF wireless communication portion 6. The wireless communication apparatus M receives a DC power supply from an external power source P, and operates wireless communication to a wireless communication station, which is not shown in the figures. The external power source P supplies the power source not only to the wireless communication apparatus M but also to other electric apparatuses, which are not shown in the figures.

The power source IC 1 includes its component parts such as a RC oscillator (low accuracy oscillator) 1a, a frequency divider 1b, a clock signal switching portion 1s, DC/DC converter (power converter) 1d, a first buffer 1e, and a second buffer 1f. The RC oscillator 1a generates a first clock signal for a switching operation of the a DC/DC converter 1d and outputs to the clock signal switching portion 1c. Comparing to TCXO2, the RC oscillator 1a is an oscillator which has a feature of low consumption though it is low frequency accuracy. The frequency divider 1b divides the operation clock signal input from the TCXO 2 at a predetermined dividing rate, generates a second clock signal for switching operation of the DC/DC converter 1d and outputs to the clock signal switching portion 1c.

The clock signal switching portion 1c controlled by the control IC 4, switches the first clock signal input from the RC oscillator 1a and the second clock signal input from the frequency divider 1b selectively and outputs to the DC/DC converter 1d. When the direct current supply from the external power source P is started, the clock signal switching portion 1c outputs the first clock signal to the DC/DC converter 1d. The DC/DC converter 1d performs the switching operation, based on the first clock signal or the second clock signal input from the clock signal switching portion 1c. After the switching operation based on a frequency of the first clock signal or the second clock signal as the operating frequency, the DC/DC converter 1d transforms the DC voltage supplied from the external power source P to a DC voltage appropriate to other portions inside the wireless communication apparatus M (the TCXO 2, the timer clock oscillator 3, the control IC 4 and RF wireless communication portion 6), and supplies it to other portions. It should be noted that the DC/DC converter 1d supplies the direct current to the TCXO 2 and the RF wireless communication portion 6 in accordance with a request from the control IC 4.

The first buffer 1e controlled by the control IC 4, buffers the operation clock signals input from the TCXO 2 and outputs the operating clock signals to the control IC 4. The second buffer 1f controlled by the control IC 4, buffers the timer clock signals input from the timer clock oscillator 3 and outputs the timer clock signals to the control IC 4.

The TCXO 2 is a temperature-compensated crystal oscillator applied for operating the control IC 4 and the RF wireless communication portion 6, generates operation clock signals of a certain frequency which does not harm (give disturbance to) other electric apparatuses when it is divided in predetermined dividing rate, and outputs to the frequency divider 1b of the power source IC 1, the first buffer 1e and the RF wireless communication portion 6. Comparing to the RC oscillator 1a the TCXO 2 is an oscillator which has a feature of high frequency accuracy though it is high consumption of electric power. The timer clock oscillator 3 outputs timer clock signals (frequency: 32 kHz) which are clock signals for a timer count to the second buffer 1f of the power source IC 1.

The control IC 4 controls overall operation of the wireless communication apparatus M in accordance with a predetermined control program stored in the memory 5.

The control IC 4 operates characteristic controlling operations based on the control program, such as controlling an intermittent receiving operation of the RF wireless communication portion 6 to receive annunciation signals transmitted from the wireless communication base station and controlling the clock signal switching portion 1c, so as to switch the first clock signal and the second clock signal selectively and to output to the DC/DC converter 1d, in accordance with receiving time and non-receiving time of the annunciation signals. Practically, during the receiving time for receiving the annunciation signals, the control IC 4 controls the clock signal switching portion 1c to output the second clock signal to the DC/DC converter 1d, and during the non-receiving time for non-receiving of the annunciation signals, the control IC 4 controls the clock signal switching portion 1c to output the first clock signal to the DC/DC converter 1d During the receiving time for receiving the annunciation signals, the control IC 4 controls the DC/DC converter 1d to supply the DC power voltage to the TCXO 2, and during the non-receiving time for non-receiving of the annunciation signals, the control IC 4 controls the DC/DC converter 1d to suspend supplying the DC power voltage to the TCXO 2. Details of such operations of the control IC 4 are explained below.

The memory 5 stores the control program operated by the control IC 4 and other non-volatile data, and is used as a working area for control operation of the control IC 4. The RF wireless communication portion 6, controlled by the control IC 4, operates frequency conversion and demodulation on each received signal of the annunciation signals and the like received via the antenna 7, and outputs a demodulated signal of the received signal to the control IC 4. The RF wireless communication portion 6 operates modulation and frequency conversion on sound signals, data signals and the like for transmission input from the control IC 4, and transmits via the antenna 7 as transmission signals to the wireless communication base station. The antenna 7 operates both receiving of the annunciation signals and the like transmitted from the wireless communication base station and transmitting.

Figure 2:
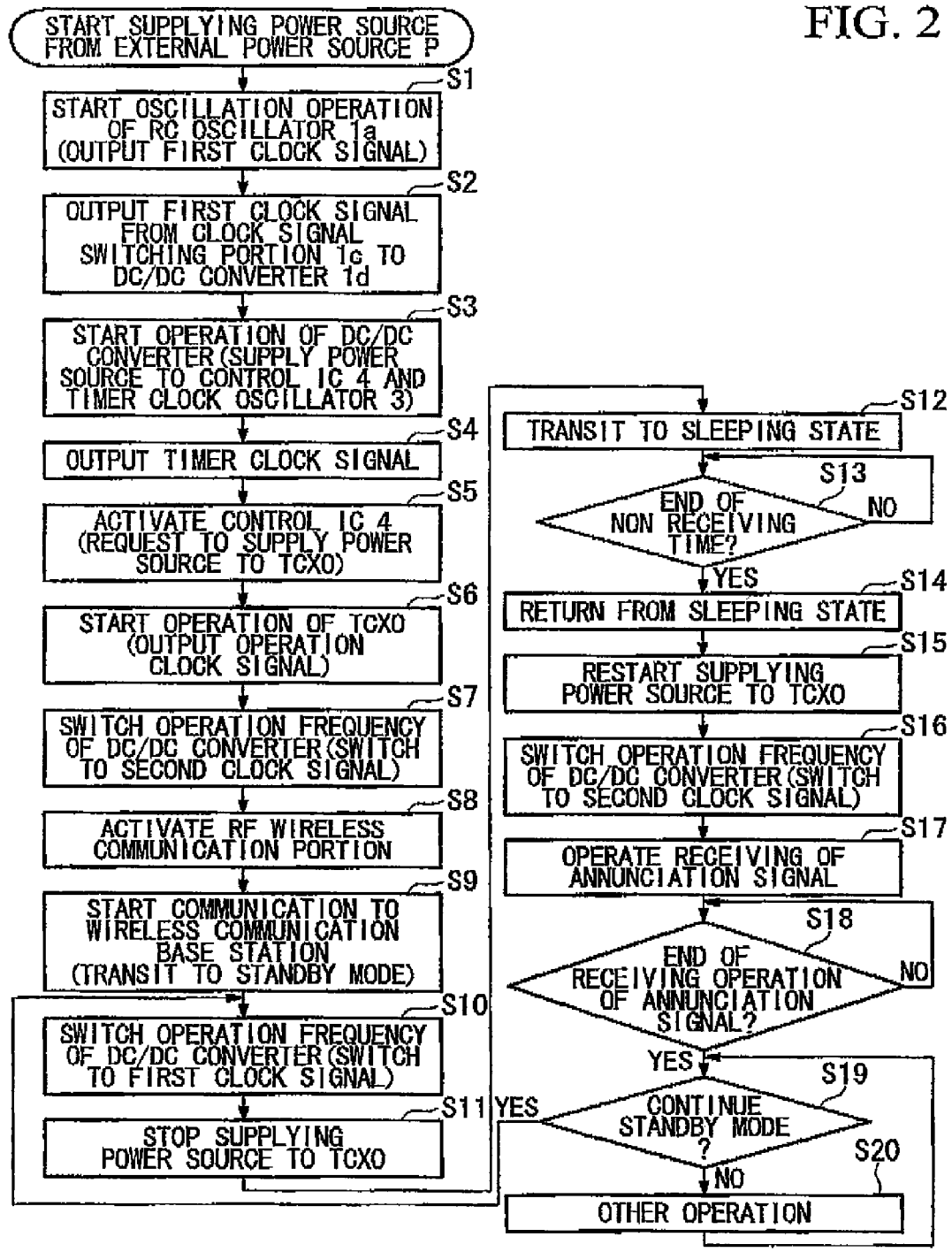
FIG. 2 is an operation flowchart of a wireless communication apparatus in one embodiment of the present invention.

It should be noted that the RC oscillator 1a has lower frequency accuracy than the TCXO 2 and generates a frequency which has fluctuation, therefore, the generated frequency has fluctuation to some extent. The first clock signal generated by frequency dividing can have a frequency which is included in a frequency band that has a negative influence on other electric apparatuses. When the DC/DC converter 1d operates switching in accordance with the first clock signal, because of the conduction noise occurring on the power line between the external power source P and the DC/DC converter 1d, there is a possibility that other electric apparatuses are harmed. On the other hand, the TCXO 2 is an oscillator with higher frequency accuracy, generates frequency with a very small fluctuation, therefore, by operating frequency division on the operation clock signal with the frequency divider 1b, it is possible to generate the desired second clock signals in accordance with a design that are accurate and do not have a negative influence on other electric apparatuses. Hence, when the DC/DC converter 1d operates switching in accordance with the second clock signal, other electric apparatuses are not harmed by the conduction noise even though the conduction noise occurs on the power line. Based on the description above, operations of the wireless communication apparatus M are explained referring to a flow chart of FIG. 2.

First, when the DC power source is supplied to the wireless communication apparatus M (practically, the power source IC 1) from the external power source P, the RC oscillator 1a of the power source IC 1 starts oscillating, generates the first clock signal and outputs it to the clock signal switching portion 1c (step S). This is time when the power source starts to be supplied from the external power source P, therefore, the clock signal switching portion 1c outputs the first clock signal to the DC/DC convener 1d (step S2). When the DC/DC converter 1d is input the first clock signal, the DC/C converter 1d operates switching by applying the frequency of the first clock signal as the operation frequency, operates a voltage conversion on the DC power source voltage supplied from the external power source P, and supplies the converted DC power source voltage to the timer clock oscillator 3 and the control IC 4 (step S3).

When the power source voltage is supplied, the timer clock oscillator 3 starts oscillating, generates the timer clock signal and outputs it to the second buffer 1f (step S4). On the other hand, the control IC 4 is activated when the power source voltage is supplied, requests the DC/DC converter 1d to supply the power source voltage to the TCXO 2, and requests the second buffer 1f to output the timer clock signal to the control IC 4 (step S5). When tie power source voltage is supplied, the TCXO 2 starts oscillation operation, generates the operation clock signal, and outputs it to the frequency divider 1b, the first buffer 1e, and the RF wireless communication portion 6 (step S6). The frequency divider 1b divides the operation clock signal at a predetermined frequency division rate, generates the second operation clock signal, and outputs it to the clock signal switching portion 1c. The first buffer 1e, controlled by the control IC 4, outputs the operation clock signal to the control IC 4.

The control IC 4 controls the clock signal switching portion 1c in order to output the second clock signal to the DC/DC converter 1d. That is, the operation frequency of the DC/DC converter 1d is switched to the frequency of the second clock signal (step S7). The control IC 4 requests the DC/DC converter 1d to supply the power source voltage to the RF wireless communication portion 6, and therefore, the RF wireless communication portion 6 is activated (step S8), The RF wireless communication portion 6, controlled by the control IC 4, starts communication to the wireless communication base station and, registers a location of the wireless communication apparatus M on the communication network, and then the control IC 4 transits to a standby mode (a standby state in which the apparatus is waiting for a call or receiving of signals) (step S9). The control IC 4, in the standby mode, when there is no signal to be received, in order to save consuming electric power, conducts an intermittent receiving operation of the annunciation signal as described below.

When the intermittent receiving is started, the control IC 4 controls the clock signal switching portion 1c so as to output the first clock signal to the DC/DC converter 1d. That is, the operation frequency of the DC/DC converter 1d is switched to a frequency of the first clock signal (step S10). The control IC 4 controls the DC/DC converter 1d so as to stop supplying the power source voltage to the TCXO 2, and therefore, the oscillation operation of the TCXO 2 is stopped (step S11). The control IC 4, after stopping the oscillation operation of the TCXO 2, transits to a sleeping state (step S12).

This sleeping state is kept during in non-receiving time of the annunciation signal. While in the non-receiving time of the annunciation signal, the RF wireless communication portion 6 does not operate communication operation, and the control IC 4 is in the sleeping state, therefore, it is not needed for the TCXO 2 to supply the operation clock signal to the RF wireless communication portion 6 and the control IC 4. Hence, there is a problem in which consuming of the power source increases if the TCXO 2 keeps the oscillation operation. As described above, the oscillation operation of the TCXO 2 is stopped while in the non-receiving time and the RC oscillator 1a which has a feature of low power consumption supplies the first clock signal to the DC/DC converter 1d therefore, it is possible to reduce the power consumption of the wireless communication apparatus M as a whole.

The conduction noise has a characteristic such as changing its volume of noise in accordance with electrical energy supplied from the power source IC 1. That is, the second clock signal which can set a limitation on the fluctuation of the conduction noise is applied while the control IC 4 which needs a large amount of electrical energy is operating, therefore, other electrical apparatuses are not harmed. When the DC/DC converter 1d operates the switching operation in accordance with the first clock signal, on the power line, there is a possibility of generating the conduction noise which harms other electrical apparatuses. However, the electrical energy consumed by the wireless communication apparatus M as a whole is small, therefore, the amount of the conduction noise is small and it is possible to reduce a negative influence on the other electrical apparatuses to the lowest level.

While in the sleeping state, the control IC 4 checks whether or not it is the end of the non-receiving time of the annunciation signal based on a timer clock signal (step S13), and returns from the sleeping state (step S14) if the end of the non-receiving time is detected ("YES"). It should be noted that, in step S13, the control IC 4 keeps in the sleeping state if it is not the end of the non receiving state, that is, "NO". The control IC 4 operates the DC/DC converter 1d so as to start supplying the power source voltage to the TCXO 2 in order to start the oscillation operation of the TCXO 2 (step S15), and operates the clock signal switching portion 1c so as to output the second clock signal to the DC/DC converter 1d. That is, the operation frequency of the DC/DC converter 1d is changed to the frequency of the second clock signal (step S16). In accordance with such a manner, after changing the operation frequency of the DC/DC converter 1d, the control IC 4 controls the RF wireless communication portion 6 in order to receive the annunciation signal transmitted from the wireless communication base station (step S17).

As described above, at the time when the annunciation signal is received the control IC 4 and the RF wireless communication portion 6 should be operated, therefore, the operation clock signal from the TCXO 2 is needed. It should be noted that, by supplying the first clock signal continuously to the DC/DC converter 1d, when the annunciation signal is received, the amount of electrical energy consumed by the wireless communication apparatus M as a whole is large, therefore, the volume of the conduction noise is large and other electrical apparatuses are harmed. As described above, upon receiving the annunciation signal, by switching from the first clock signal to the second clock signal and supplying it to the DC/DC converter 1d, the conduction noise is generated on the power line, however, it is possible to limit the frequency in a small ranges therefore, by setting the clock value or the division frequency beforehand so as to adjust the frequency to be in a range that does not harm other electrical apparatuses, it is possible to prevent a negative influence on other electrical apparatuses because of the conduction noise.

The control IC 4 detects whether or not the receiving operation of the annunciation signal is finished (step S18), and when the receiving operation of the annunciation signal is finished ("YES"), the control IC 4 checks whether or not the standby state is kept (step S19). That is, it checks whether or not another operation (such as communication to the wireless communication station) is needed, and when the standby state is not kept ("NO"), the control IC 4 operates the other operation by applying the frequency of the second operation clock signal as the operation frequency of the DC/DC converter 1d (step S20). On the other hand, in step S19, when it is detected that the standby state is kept ("YES"), the control IC 4 transits to the operation of step S10. It should be noted that, even in the non-receiving time, if it is needed to operate the other operation, the control IC 4 returns from the sleeping state and operates steps S15 and S16.

In the embodiment above, only an example of the sleeping time of the intermittent receiving and receiving time of the annunciation signal is described, however, naturally, there are requirements for watching or checking requests for communication. In other words, not only when the annunciation signal is received the control IC 4, the RF wireless communication portion 6 or the TCXO 2 are activated (in a state of consuming large amount of electrical power), but also when a download of data is requested, when a request of an incoming call is received or the like, the control IC 4, the RF wireless communication portion 6 or the TCXO 2 which supplies the clock signals for them are activated, therefore, the second clock signal is supplied to the power source IC 1, Moreover, when such a communication is requested, after transiting to the standby mode when the communication is finished, countdown for transiting to the intermittent receiving is stated and the operation is restarted from step S9.

As described above, in accordance with the wireless communication apparatus M, by operating the DC/DC converter 1d based on the second clock signal upon receiving the annunciation signal, it is possible to reduce a negative influence on other electrical apparatuses because of the conduction noise, and by operating the DC/DC converter 1d based on the first clock signal while in the non-receiving time of the annunciation signal, it is possible to reduce a negative influence on other electrical apparatuses because of the conduction noise and to reduce consuming of the electrical power. Moreover, since it is not needed to prepare an additional circuit such as a filter or the like, it is possible to prevent the wireless communication apparatus M from increasing in cost or becoming larger.

It should be noted that the present invention is not limited in scope of the embodiment above, and, for example, the following examples of modifications are suggested.

(1) In the embodiment above, the DC/DC converter 1d is operated based on the first clock signal when it is in non-receiving time of the annunciation signal, however, it is not needed to be limited to such a scope, it is possible for the timer signal generated by the timer clock oscillator 3, instead of the first clock signal, to be supplied to the DC/DC converter 1d if there is no possibility of increasing electric power consumed by the wireless communication apparatus M as a whole.

(2) In the embodiment above, a case is explained of using the RC oscillator 1a, however, this is not a limitation and it is possible for another device to be applied if the device has a feature of low electric power consumption and low frequency accuracy. Moreover, not only the TCXO 2, but also another oscillator is suitable if the oscillator has a feature of him frequency accuracy and high electrical power consumption.

(3) In the embodiment above, a negative influence on operations of the other electrical apparatuses is prevented, and the present invention especially prevents radiation of the conduction noise in a specific band, therefore, it is easy to consider a negative influence on electoral apparatuses including receivers which receive in the specific frequency band.

Moreover, if a receiver which receives in multiple frequency bands is included in other electrical apparatuses, a measure for the conduction noise is more severe and it is needed to be limited narrower in a specific band, therefore, the present invention is very useful.

(4) In the embodiment above, an example in which electrical power is supplied not only to the wireless communication apparatus, but also to other electrical apparatuses from the external power source, is shown, however, this is not a limitation. When there is an electrical apparatus or a receiver which is easily affected by noise of a specific frequency band, naturally in a close position from a power line, it is not preferable to have the conduction noise, therefore, it is very useful especially in a case such as applying a long power line.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A wireless communication apparatus comprising:
   a power conversion apparatus which operates a switching operation based on an operation frequency regulated in accordance with an operation clock signal and which converts externally supplied power to a DC power for an inside power source;

a wireless communication portion;

a high accuracy oscillator which is applied for communication operation of the wireless communication portion, and which generates a predetermined clock signal which becomes a predetermined frequency by dividing at a predetermined division rate;

a low accuracy oscillator which has a lower accuracy than the high accuracy oscillator, and which generates a first clock signal close to the predetermined frequency;

a frequency divider which divides the predetermined clock signal at the predetermined division rate, and generates a second clock signal; and a control portion which conducts the switching operating in which the operation clock signal supplied to the power conversion apparatus is switched to the second clock signal when the wireless communication portion receives an annunciation signal, and to the first clock signal when receiving of the annunciation signal is suspended, wherein when the second clock signal is supplied to the wireless communication portion, the wireless communication portion conducts an operation, in an intermittent receiving operation, while the annunciation signal is not received, the control portion stops operations of both the wireless communication portion and the high accuracy oscillator, and operation of the power converter apparatus is started based on the first clock signal.

2. The wireless communication apparatus according to claim 1, wherein the control portion stops oscillation operation of the high accuracy oscillator upon suspending receiving of the annunciation signal.

3. The wireless communication apparatus according to claim 1, wherein the control portion transits to a sleeping state upon suspending receiving of the signal.

4. The wireless communication apparatus according to claim 1, wherein the low accuracy oscillator is a RC oscillator.

5. The wireless communication apparatus according to claim 1, wherein the high accuracy oscillator is a TCXO (Temperature Compensated Crystal Oscillator).

6. The wireless communication apparatus according to claim 1, wherein at the end of receiving the annunciation signals, the control portion conducts a controlling operation in which the first clock signal is supplied to the power conversion apparatus if the wireless communication apparatus is in a standby mode, and in which the second clock signal is supplied to the power conversion apparatus if the wireless communication apparatus is not in the standby mode.

7. The wireless communication apparatus according to claim 1, wherein the low accuracy oscillator consumes lower power than the high accuracy oscillator.

8. The wireless communication apparatus according to claim 1, wherein when the externally supplied power is supplied via the power conversion apparatus, the second clock signal is supplied to the power conversion apparatus in accordance with the switching operation by the control portion.

9. An operation frequency control method of a power conversion apparatus in a wireless communication apparatus which includes: the power conversion apparatus which operates a switching operation based on an operation frequency regulated in accordance with an operation clock signal and which converts externally supplied power to a DC power for an inside power source; and a wireless communication portion which communicates with a base station, the operation frequency control method comprising the steps of:

a first step of generating with high accuracy a predetermined clock signal which is applied for communication operation of the wireless communication portion, and which has a predetermined frequency by dividing at a predetermined division rate;

a second step of generating a first clock signal which has a lower accuracy than the first step and which is close to the predetermined frequency;

a third step of generating a second clock signal by dividing the predetermined clock signal at the predetermined division rate; and a fourth step of conducting the switching operation in which the operation clock signal supplied to the power conversion apparatus is switched to the second clock signal when the wireless communication portion receives an annunciation signal from the base station and to the first clock signal when receiving of the annunciation signal is suspended, wherein when the second clock signal is supplied to the wireless communication portion, the wireless communication portion conducts an operation, in an intermittent receiving operation, while the annunciation signal is not received, operations of both the wireless communication portion and a high accuracy oscillator are stopped, and operation of the power converter apparatuss is started based on the first clock signal.

10. The wireless communication apparatus according to claim 1, wherein the control portion monitors and detectan event of a communication conducted by the wireless communication portion and conducts a controlling operation in which the second clock signal is supplied to the power conversion apparatus while the wireless communication portion is conducting a communication operation and in which the first clock signal is supplied to the power conversion apparatus when the communication operation by the wireless communication portion is finished.

11. The wireless communication apparatus according to claim 10, wherein after detection of the event of the communication, when the communication operation by the wireless communication portion is finished, the control portion controls the wireless communication portion to conduct the intermittent receiving operation of the annunciation signals in which the wireless communication portion repeatedly conducts both receiving of the annunciation signals and suspension of receiving of the annunciation signals.

12. The wireless communication apparatus according to claim 10, wherein when the wireless communication portion receives a request for an incoming call from a communication network via a base station, the control portion conducts a controlling operation in which the second clock signal is supplied to the power conversion apparatus.

13. The operation frequency control method of the power conversion apparatus according to claim 9, further comprising:

a fifth step of monitoring and detecting an event of communication conducted by the wireless communication portion; and a sixth step of supplying the second clock signal to the power conversion apparatus while the wireless communication portion is conducting a communication operation and supplying the first clock signal to the power conversion apparatus when the communication operation by the wireless communication portion is finished.

14. The operation frequency control method of the power conversion apparatus according to claim 13, further comprising a seventh step of, after detecting the event of communication, when the communication operation by the wireless communication portion is finished, conducting an intermittent receiving operation of the annunciation signals in which both receiving of the annunciation signals and suspension of receiving of the annunciation signals are repeatedly conducted by the wireless communication portion.

15. The operation frequency control method of the power conversion apparatus according to claim 13, further comprising
an eighth step of supplying the second clock signal to the power conversion apparatus when the wireless communication portion receives a request for an incoming call from a communication network via the base station.

16. The operation frequency control method of the power conversion apparatus according to claim 13, further comprising:
a tenth step of, at the end of receiving the annunciation signals, supplying the first clock signal to the power conversion apparatus if the wireless communication apparatus is in a standby mode; and
an eleventh step of at the end of receiving the annunciation signals, supplying the second clock signal to the power conversion apparatus if the wireless communication apparatus is not in the standby mode.

17. The operation frequency control method of the power conversion apparatus according to claim 9, wherein the low accuracy oscillator consumes lower power than the high accuracy oscillator.

18. The operation frequency control method according to claim 9, wherein when the externally supplied power is supplied via the power conversion apparatus, the second clock signal is supplied to the power conversion apparatus in accordance with the switching operation.

* * * * *